_United States Patent Office_  3,595,659
Patented July 27, 1971

3,595,659
NON-SILVER DIRECT POSITIVE DYE BLEACH-OUT SYSTEM USING INDIGOID DYES AND COLORED ACTIVATORS
Joanne C. Gerlach, Watertown, Ian D. Robinson, Auburndale, and Kenneth D. Jordan, Walpole, Mass., assignors to Arthur D. Little, Inc., Cambridge, Mass.
Filed Oct. 3, 1968, Ser. No. 764,766
Int. Cl. G03c 1/72, 5/24
U.S. Cl. 96—48                    19 Claims

ABSTRACT OF THE DISCLOSURE

A direct positive bleach-out photographic system suitable for photography and photocopy work. An indigoid dye and a colored activator, supported in a binder, form the photosensitive system which is bleached out when exposed to visible light. A few are sensitive to ultraviolet light. The system is adapted to forming prints and transparencies in black and white, monochrome and full color.

CROSS-REFERENCES TO RELATED APPLICATIONS

In four copending applications we have disclosed four other direct positive bleach-out systems. These applications are Ser. No. 764,661 filed Oct. 3, 1968 directed to a combination of polymethine dyes and essentially colorless activators; Ser. No. 764,662 filed Oct. 3, 1968 directed to a combination of polymethine dyes and colored activators; Ser. No. 764,744 filed Oct. 3, 1968 directed to a combination of indigoid dyes and essentially colorless activators; and Ser. No. 764,742 filed Oct. 3, 1968 directed to a combination of stable free radical dyes and essentially colorless activators.

This invention relates to a photographic method and article and more particularly to a direct positive bleach-out photographic system suitable for photography to produce black-and-white, monochrome and full color prints and transparencies, for photocopying to make black-and-white, monochrome and full color copies and to processes and articles which involve as at least one step or product the making of a photographic copy.

There is, of course, a large body of prior art concerned with the general fields of photography and photocopying. This body of prior art includes the use of silver halide emulsions with their attendant darkroom processing techniques, the employedment of photoconductive particles or films with accompanying formation of electrostatic latent images and subsequent toning and fixing, and the formation of vesicular images in water-in-sensitive photographic materials. However, since these prior art techniques are completely distinguishable from that of the present invention, they need not be discussed. Rather, the prior art which is pertinent to this invention is set forth in a series of United States patents (see for example USP 3,102,027, 3,104,973, 3,114,635, 3,154,416 and 3,155,509) describing a so-called 'bleach-out" system employing a light-sensitive combination of a dye and an activator. Exposure of these light-sensitive materials effects bleaching of the dyes in those areas exposed to light of a predetermined wavelength range. The unexposed areas remain the color of the original dye, thus forming a contrast which gives rise to a copy or photograph.

Bleach-out systems of this type have certain marked advantages, among which may be listed the absence of graininess, the elimination of darkroom procedures and rapidity of access. However, the prior art system, although realizing these advantages at least in part, possess certain inherent disadvantages. As activators for the dye systems, the prior art uses an alkyl, aryl, or aralkyl compound having at least three halogen (Cl, Br, or I) atoms attached to a single carbon atom, e.g., $CBr_4$. These activators are highly toxic and noxious to use. Moreover, some of the light-sensitive systems of the prior art show a marked tendency to develop color in the bleached areas during use or storage even in the absence of light, thus causing eventual obliteration of the copy. Most of these prior art systems cannot be fixed satisfactorily.

It would, therefore, be desirable to have a positive bleach-out photographic system which retained all the advantages inherent in such a system and which at the same time is capable of overcoming at least some of the more restrictive disadvantages associated with the prior art systems.

It is therefore a primary object of this invention to provide a light-sensitive, positive bleach-out photographic system which is capable of providing a sharp, positive grainless copy of rapid access which exhibits improved stability. It is another object of this invention to provide a light-sensitive system of the character described which can be chosen to be non-toxic and to eliminate any noxious or unpleasant aspects in its formulation, application to a substrate, use and developing. It is yet another object to provide such a system which can be made extremely light-fast, which is flexible with respect to the manner in which it may be exposed, to the type of processing to which it is subjected and to the type of final product achieved.

It is another primary object of this invention to provide a method of photography or photocopying which is capable, through the choice of dyes and structure of the light-sensitive system, of producing prints or transparencies in black-and-white, monochrome or full color which are extremely light-fast and which may be applied to cloth as well as to paper substrates.

It is another primary object of this invention to provide protosensitive articles of the character described and methods of using them which are simple to formulate and use and which may be relatively inexpensive. Other objects of the invention will in part be obvious and will in part be apparent hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings in which.

Figure 1:
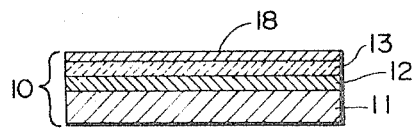
FIG. 1 is a cross section of the light-sensitive system of this invention applied to a substrate.

The photosensitive positive bleach-out system of this invention may be defined as one which comprises an indigoid dye such as an indigo, thioindigo, or selenoindigo dye, or a combination of such dyes and an activator which is a colored photo-reducible dye. More specifically, these activators are compounds which are reduced when exposed to a predetermined wavelength range of the electromagnetic spectrum. In the case of the systems of this invention this wavelength range generally encompasses the normally visible light wavelength range. Some of the systems are also bleached by ultraviolet light.

The bleach-out dyes usable in the photosensitive system of this invention may be generally defined as the indigoid dyes which include the indigo and indirubin dyes. These dyes have long been known as very intense, stable, and extremely light-fast dyes. The indigoid dyes, moreover, offer a wide range of colors as well as the possibility of a one-dye black, this latter being particularly attractive for a photocopy system.

The term "indigoid" dye as used hereinafter is meant to include all those dyes generally considered by those skilled in the art to fall within the general class of dyes having as their chromophoric structure the conjugated grouping

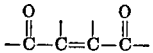

which is reducible to the substantive leuco form. A substantial body of art exists on the synthesis, classification, and naming of these indigoid dyes. (See for example "The Chemistry of Synthetic Dyes" by K. Venkataraman, Academic Press, Inc., New York, 1952, pp. 1003–1045; and "Colour Index" second edition, 1956, volume 3 published in the United States by the American Association of Textile Chemists and Colorists, pp. 3547–3567.)

There are a number of ways in which the indigoid dyes may be classified and described. The following brief description represents one way of grouping these dyes in subclasses better to illustrate the various structures possible. These subclasses and the examples given are meant to be illustrative and not limiting.

(1) Symmetrical derivatives of indigo, thioindigo and selenoindigo represented as

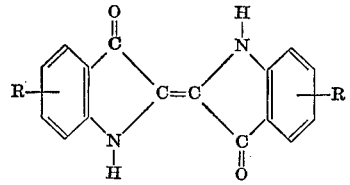

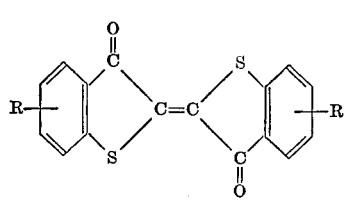

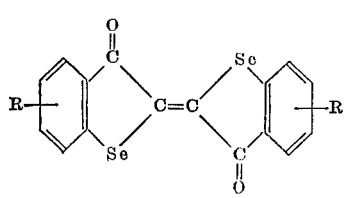

wherein R may be one or more of the following: lower alkyl, lower alkoxy, Cl, Br, NH$_2$, NaSO$_3$, aryl and substituted aryl. An example of this subclass is

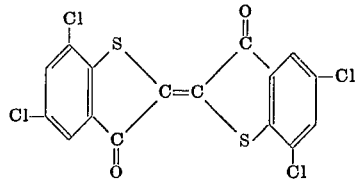

which is known as C.I. Vat. Blue 41 and is reddish blue in color.

(2) Asymmetrical derivatives of indigo, thioindigo or selenoindigo represented as

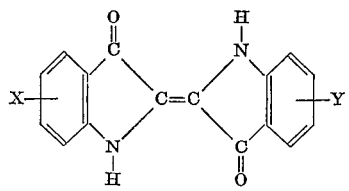

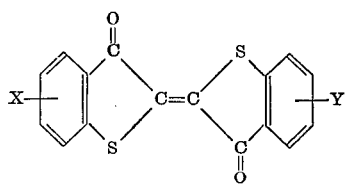

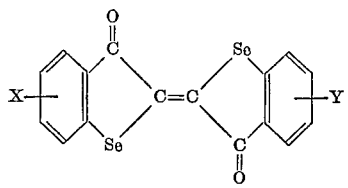

wherein X and Y are different and may be one or more of the following: lower alkyl, lower alkoxy, Cl, Br, NH$_2$, NaSO$_3$, aryl, and substituted aryl. An example of this subclass is

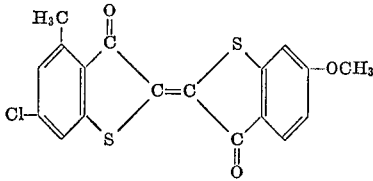

which is known as C.I. Vat Red 6 and is bright red in color.

(3) Indirubins represented as

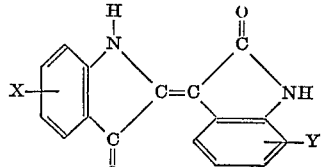

wherein X and Y have the same meaning as above. An example of this subclass of indigoid dye is

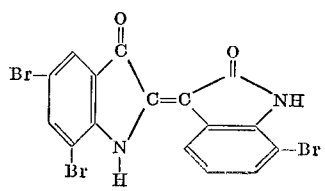

which is known as Ciba Heliotrop B and is magenta red in color.

(4) Indigos and indirubins wherein one imino group is replaced by sulfur represented as

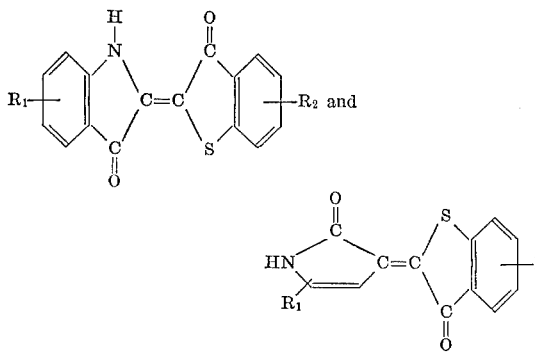

wherein R₁ and R₂ may be the same or different and are one or more of the following: lower alkyl, lower alkoxy, Cl, Br, NH₂, NaSO₃, aryl and substituted aryl. Two examples of this subclass of indigoid dyes are

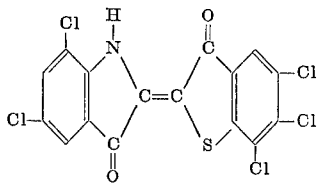

which is known as C.I. Vat Violet 5 and is bluish violet in color; and

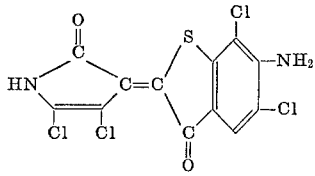

which is known as Algol Brown GN and is dull yellowish orange in color.

(5) Dyes containing one ketone-bearing heterocyclic grouping connected by means of a double bond to a carbon alpha to a keto or oxo group in an aromatic system as represented by

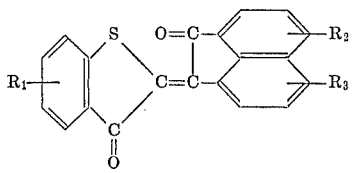

wherein R₁, R₂, and R₃, which may be the same or different, are one or more radicals which may be lower alkyl or halide. An example of this subclass of indigoid dyes is

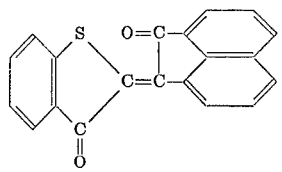

which is known as Ciba Scarlet G, C.I. 1228 and is scarlet in color.

The final choice among these various dyes will depend upon the background color desired, the rapidity of access needed, the activator used and the substrate employed. The proper combination of dye and activator to meet performance requirements for the photosensitive system is well within the ability of one skilled in the art.

The activators suitable for use with these dyes are in themselves dyes—namely those dyes well known in the art as photoreducible dyes (see for example "Light-Sensitive Systems" by Jaromir Kosar, John Wiley & Sons, Inc., New York, 1965, pp. 184–187). These dyes are known to undergo reduction to their leuco form in the presence of electron donors when exposed to visible light. The term "photoreducible" as used hereinafter is also meant to include phenanthrenequinone and anthraquinone and their derivatives which in the dye-activator systems of this invention appear to behave as photoreducible dyes. For convenience these are all referred to as photo reducible dyes, their function being to cause bleaching of the image dye under the radiation used, e.g., visible light. However, the actual mechanism by which this is accomplished is not precisely known.

In general the following classes of dyes are included in the activator dyes of this invention:

(1) The thiazines of the general formula

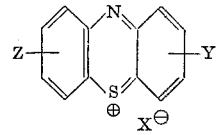

wherein X⁻ is an acid anion

Y and Z are exemplified, but not limited to, one or more of the following: —H, alkyl, substituted alkyl, aryl, substituted aryl, benzo, substituted benzo, —O⁻, —SO₃⁻, —Cl, —Br, —I, —OR, —NRR', $$-\underset{\underset{O}{\parallel}}{C}-OR \text{ and } -\underset{\underset{O}{\parallel}}{C}-NRR'$$

wherein R and R' may, for example, be —H, alkyl, substituted alkyl, aryl or substituted aryl;

(2) The thiazoles of the general formula

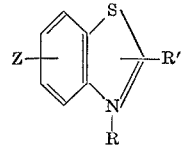

where Z has the same meaning as in the thiazine class and R and R' may be, for example, —H, alkyl, substituted alkyl, aryl or substituted aryl and R may be omitted;

(3) The acridines of the general formula

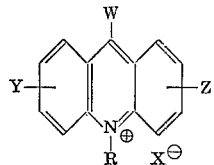

wherein R, Y and Z are the same as in the thiazines and W is the same as Y and Z;

(4) The azines and oxazines of the general formulas

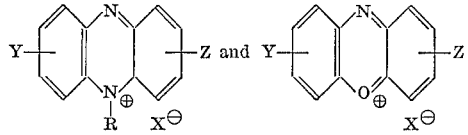

wherein R, Y and Z have the same meanings as they do in the thiazine class;

(5) The anthraquinones of the general formula

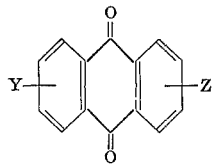

wherein Y and Z have the same meaning as in the thiazine class and in addition may be —SO₃H, —SH, —NO₂ or a ring residue of a 5- or 6-membered heterocyclic ring;

(6) The phenanthrenequinones of the general formula $$\text{structure with Y and Z substituents}$$

wherein Y and Z have the same meaning as in the anthraquinone class;

(7) The xanthenes (A) of the general formula $$\text{xanthene structure with R, R', R'', R''', R'''', Y, Z substituents and } X^\ominus$$

wherein R, R', R'', R''', R'''', Y and Z may be exemplified by, but not limited to, alkyl, substituted alkyl, aryl and substituted aryl, and $X^\ominus$ is an acid anion; and (8) The xanthenes (B) of the general formula $$\text{xanthene structure with R, W, Y, Z substituents}$$

wherein R has the same meaning as in the xanthenes (A) and W and Z may be exemplified, but not limited to, alkyl, substituted alkyl, aryl, substituted aryl, —SR,

—SO₃—

—COOR, —NO₂, —Cl, —Br, and —I.

The following list of photoreducible dyes illustrates specific activators which may be used with the bleach-out dyes to form the photosensitive system of this invention. This list is meant to be illustrative and not limiting:

acid violet
acridines (red, orange and yellow)
acriflavine
Azure B
benzoflavine
chromogen red B
chromoxane brilliant red
coerulein
fluorescein and its naphthalene analog
gallein
hexahydroporphin
mercurochrome
methylene blue
negrosine C
phenosafranine
phloxine
pyronine G
riboflavin
rivanal
phenanthrenequinone
quinalizarin
rhodamines (B, S and 5G)
rose bengal
safranines (O, T)
sulforhodamine B
thioflavine T
thionin
toluidine blue O In the forming the photosensitive system of this invention, the mole ratio of activator to dye may range from about 0.01-to-1 to about 10-to-1, with about 1-to-1 being typical and generally preferred. The activator-dye ratio employed will, of course, depend upon the activator-dye system as well as upon the performance characteristics desired from the photosensitive system.

In compounding the photosensitive composition, it may also be desirable to incorporate one or more additives. For example, such additives may include, but are not limited to, plasticizers, agents to control the coating properties, and compounds capable of filtering specific wavelengths, particularly ultraviolet. In addition, encapsulated fixing precursors may be included for mechanical release (e.g., application of pressure to break the capsules) after exposure.

The photosensitive system (dye plus activator) is affixed to a substrate through a film-forming binder. This is most conveniently done by forming a solution of the binder along with any additives such as plasticizers, etc., in a suitable solvent and then adding the dye and activator to the solution under conditions of temperature and exposure to light which will not effect any premature bleaching of the dye. The film-forming binder must not, of course, have any adverse effects on the ability of the desired electromagnetic radiation to bleach the dye.

The role of the binder in forming a suitable photosensitive system is not completely understood; but it appears that it is desirable to use a binder having the structure $$-\underset{\underset{H}{|}}{\overset{|}{C}}-X$$

incorporated therein where X is an electronegative element. Perhaps such binders donate a hydrogen atom, a possibility if the C—H bond is of the type which is relatively easily broken. A suitable binder can be easily chosen as a result of simple experimentation with the desired dye-activator combination. If oxygen enters into the activation process when the photosensitive system is exposed, then it is preferable that the binder be oxygen-permeable.

A number of film-forming resins may be used as the binder; and the preferred one is nitrocellulose applied as a solution in acetone. Other suitable binders include, but are not limited to ethyl cellulose, polystyrene, polymethyl methacrylate, and cellulose acetate butyrate. Solvents will be chosen which are compatible with these binders, and typical solvents include, but are not limited to, acetone, toluene, methylene chloride, and mixed solvents such as toluene/tetrahydrofuran and benzene/acetone. The performance of the photosensitive system deposited in binders other than nitrocellulose may be enhanced in some systems if a precoat intermediate layer of nitrocellulose is interposed between the substrate and the photosensitive layer. The reason for this enhancement is not understood but may be evidenced by an increase in bleaching speed.

The concentration of the dye and activator in the solution of the film-forming material will be governed by the final coating weight desired and the technique used to apply the coating solution to the substrate surface. The coating weight in turn will generally determine both the image quality and speed of the photosensitive system. In general, the lighter the coating weight the higher will be the resolution and the faster will be the bleaching. The optimum coating weight will also depend upon the extinction coefficient of the photosensitive system and will generally range between about $1 \times 10^{-5}$ to about $1 \times 10^{-3}$ gram dye per square centimeter.

Typically, the concentration of the dye in the coating solution may range from about 0.01 gram per 100 milliliters to the limit of the solubility of the dye in the solution. The amount of activator present will, of course, be governed by the selected mole ratio of activator to dye as defined above.

The thickness of the liquid coating at the time of application to the substrate may vary over a wide range and will be governed by the final coating weight desired, the solids concentration of the coating solution and the method by which the coating as accomplished.

The coating composition may be applied to the substrate by any suitable, well-known coating techniques including roller coating, spraying, brushing, knife coating, and the like. Coating and drying must, of course, be accomplished under conditions which will not cause any premature bleaching of the dye, preferably in subdued light or by illumination of a safelight.

The substrate material will, of course, be chosen to give the characteristics desired in the final photograph or photocopy and such materials are well known in the art. Thus, for example, if prints or photocopies are desired, the substrate will be an opaque paper material, typically a photographic print paper. If on the other hand the final product is to be a transparency, then the substrate will be a transparent film, typically of a synthetic resin. The substrate may be flexible or nonflexible as desired, and if a protective or barrier film is interposed between the substrate and the photosensitive film, little attention need be given to the chemical characteristics of the substrate.

The interposition of an intermediate layer between the substrate and the photosensitive film may be desirable for one or more of a number of reasons. This intermediate layer of a material capable of absorbing light within a used for forming the photosensitive layer or it may be formed of any other suitable type of material. It may serve as a barrier to prevent unwanted chemical components of the substrate from making contact with the photosensitive layer may be a coating of the same film-forming material the physical properties of the substrate such as to render it smooth, make it more adhseive to the coating solution, or prevent curl of the substrate. The intermediate layer may also be used to enhance the optical properties of the photosensitive article constructed in accordance with this tion layers which are well known in the art and/or a layer. The intermediate layer may also be used to enhance given wavelength range.

FIG. 1 illustrates, in diagrammatic cross section, a photosensitive layer. As examples we may cite antihalainvention. Such an article normally takes the form of sheet 10 formed of a substrate 11, an intermediate layer 12, and a photosensitive layer 13. The article of FIG. 1 would be particularly suitable for making two-color copies or transparencies, depending on the characteristics of the substrate 11. Thus, if the substrate 11 is an opaque sheet, the final result will be a photocopy or a print, while if the substrate 11 is, for example, a transparent film, the final copy will be a transparency. As explained above, the intermediate layer 12 is optional and may be used to perform one or more of several functions. Similarly, the photosensitive layer 13 may be covered, such as with an antiabrasion coating 18.

Figure 2:
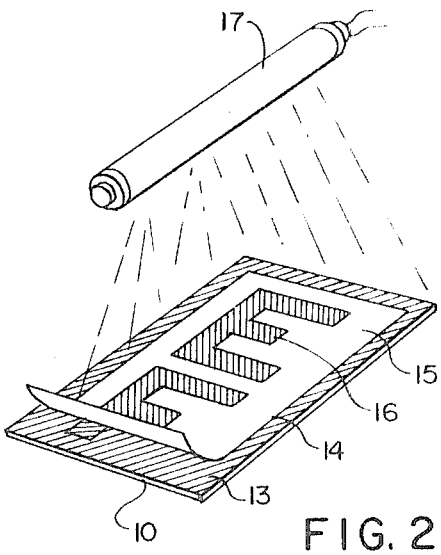
FIG. 2 illustrates the step of exposing the photosensitive sheet of FIG. 1 to a negative for copying by direct contact.

FIG. 2 illustrates the manner in which a photosensitive sheet such as that shown in FIG. 1 may be used to form a copy of a transparency having a light or transparent background 15 and indicia 16. The photosensitive sheet 10 with the photosensitive layer 13 (shown in FIG. 2 at the initiation of exposure) in contact with the transparency 14 is exposed to a suitable light source, generally in this case a source 17 of light having high visible output at the wavelength absorbed by the photosensitive system. The light from source 17 (e.g. a 500-watt photoflood lamp) will, of course, be transmitted through the light or colorless areas 15 of the transparency to strike the photosensitive layer 13 and to bleach-out the dye in those areas which are thus exposed to leave the colored activator. However, since the light is not capable of being transmitted through the dark or black areas of indicia 16, these areas remain the color of the original dye-activator system inasmuch as no bleaching has occurred. The result is the copy illustrated in FIG. 3 wherein the numeral 20 designates the dye-bleached areas now the color of the activator corresponding to the light areas of the negative used. Areas 21, corresponding directly to the indicia on the transparency, remain the color of the original dye-activator photosensitive system. The result is a two-color print.

Figure 4:
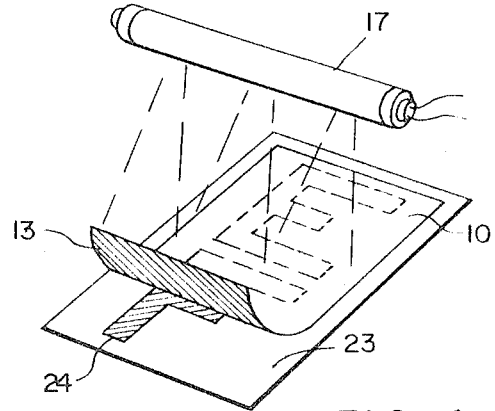
FIG. 4 illustrates the use of the photosensitive article of this invention to make a reverse copy of an opaque original by the reflex technique.
Figure 5:
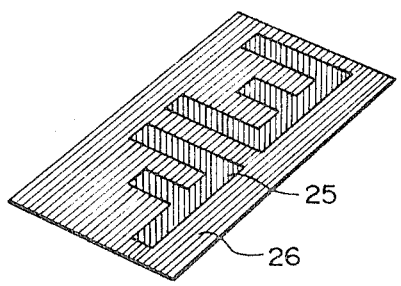
FIG. 5 illustrates the copy made by the exposure illustrated in FIG. 4.

The production of a reverse-reading copy of an opaque master is illustrated in FIGS. 4 and 5. The photosensitive sheet is placed such that the photosensitive layer 13 contacts the opaque master formed of white background areas 23 and dark indicia 24. Exposure to strong visible light will result in its reflection from the white background 23 against the photosensitive layer to produce a dyebleached area 26 (FIG. 5) and unbleached areas 25.

Figure 6:
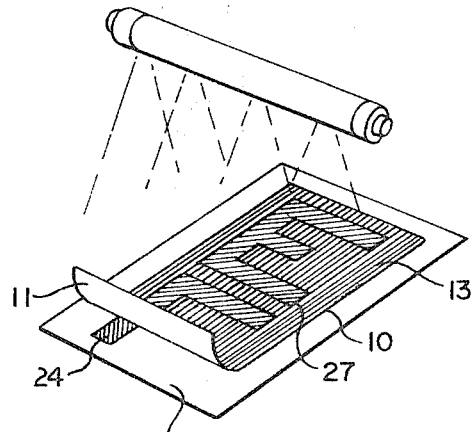
FIG. 6 illustrates the use of the photosensitive article of this invention to make a right-reading copy of an opaque original by the reflex technique.
Figure 7:
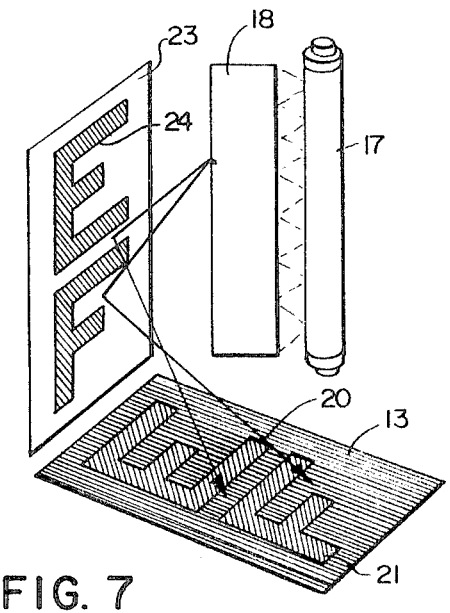
FIG. 7 illustrates the use of the photosensitive article of this invention to make a right-reading copy of an opaque original by the projection technique.

FIGS. 6 and 7 illustrate diagrammatically two ways in which right-reading copies may be made directly either by the reflex technique (FIG. 6) or the projection technique (FIG. 7). In FIG. 6 the photosensitive sheet is placed with the substrate surface in contact with the opaque master. Under these circumstances, some definition of outline is lost, but it is satisfactory for some purposes. In FIG. 7 the visible or other light from source 17 is directed through suitable well-known projection optics indicated at 18 to strike the original and to be reflected from the white or light areas 23 onto the photosensitive layer 13. This technique is quite feasible using visible light since the projection optics are relatively easy to design and inexpensive to construct.

Figure 3:
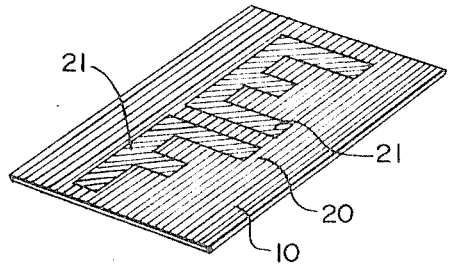
FIG. 3 illustrates the formation of the image made by the exposure illustrated in FIG. 2.

In order to be able to store the copies of FIG. 3 over an extended period of time and to use and handle them in the normal daylight, it is necessary to inactivate or fix the activator within the unbleached areas. A number of types of fixing steps may be employed, depending upon the characteristics of the activator, the overall dye system, and the manner in which the copy is to be used.

The fixing may be accomplished through one of several routes, including the destruction of the activator, removal of the activator, or by quenching of the system.

As noted previously, materials may be added to the photosensitive coating compositions, one of these being extremely small capsules which may be broken mechanically (such as by passing through the nip of two rollers) to liberate the encapsulated chemical. If a reducing agent for the activator is contained within such capsules, fixing may be accomplished by breaking them to free the reducing agent within the exposed photosensitive layer. This method offers the possibility of rapid, dry fixing.

After the initial exposure to form the image in the photosensitive layer, an overcoating containing a reducing agent for the activator which decolorizes it may be applied. Exposure to further radiation completes the fixing. Such further exposure may be effected through the use of a high intensity light source or of room light, the choice generally being the rapidity with which fixing is to be done.

A third way of fixing is to apply a solvent for the activator to the exposed photosensitive layer to remove the activator. The solvent must, of course, not be a solvent for the indigoid dye.

Finally, certain dye-activator systems may be fixed with ultraviolet light if the system is of a type which can be imaged with visible light and the activator is of a class which can be photochemically reduced by ultraviolet light. (See for example "Photopolymerization Studies: II. Imaging and Optical Fixing" in Photographic Science and Engineering 12, 177–184 (July-August 1968).)

The following examples, which are meant to be illustrative and not limiting, are given further to describe the invention.

Example 1

Sufficient acetone was added to a mixture of 10 g. nitrocellulose (Hercules RS5–6 seconds wet with 30% by weight isopropyl alcohol) and 5 g. of dibutylphthalate (plasticizer) to make 100 g. of a standard binder solution. A casein-coated, smooth finish paper was coated with a 2-mil wet thickness film of this standard binder solution and dried. This precoated paper was used in all of the examples.

To 15 ml. of the above standard binder solution were added 2.5 ml. acetone, 5 ml. of a dye solution (formed by dissolving 0.058 g. of N,N'-dimethylindigo in 50 ml.

acetone) and 0.017 g. eosin YB. A 6-mil wet thickness was coated on the precoated paper and dried—the entire process of mixing, coating and drying being carried out under subdued light.

The photosensitive sheet was exposed for 5 minutes through a 21-step Kodak Photographic Step Tablet (No. 2 with a density range 0.05 to 3.05) and a glass plate to a source of illumination at a distance of 10 inches. In the use of this standard device for measuring photosensitivity the number of steps which have a discernible lower density than the unexposed portion of the photosensitive layer is a measure of its photosensitivity. This means, of course, that the greater the number of steps, the greater is the sensitivity of the system.

When the source of illumination was a 500-watt reflector photoflood lamp, 9 steps were bleached. In the absence of any of the eosin activator, no bleaching occurred.

Figure 8:
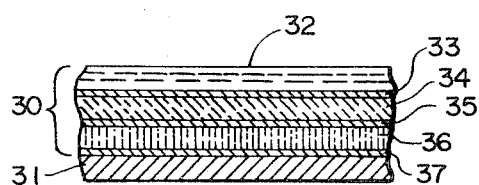
FIG. 8 illustrates in cross section one embodiment of a film suitable for producing full color prints or transparencies in accordance with this invention.

FIG. 8 illustrates diagrammatically one structural embodiment of a photosensitive film suitable for making color copies as prints or transparencies. The photosensitive layer assembly 30 is affixed to an opaque or transparent substrate 31. The photosensitive layer assembly comprises, from top down, a photosensitive layer 32 having a yellow dye which is bleached by blue light in the presence of a yellow colored activator; a barrier layer 33; a photosensitive layer 34 having a magenta dye which is bleached by green light in the presence of a magenta colored activator; a barrier layer 35; a photosensitive layer 36 having a cyan dye which is bleached by red light in the presence of a cyan colored activator; and an antihalation layer 37. One or more of the barrier layers and/ or the antihalation layer may be omitted, depending upon the characters of the dyes and activators, e.g., whether they interact or migrate from layer to layer, etc.

There are a number of dye-activator combinations which may be used. As examples, we may cite Ciba orange as dye with acridine yellow as the activator for the yellow dye-activator layer; N,N'-diacetylindigo with erythrosin or eosin as the activator for the magenta dye-activator layer; and N,N'-dimethylindigo with methylene blue or thionin as the activator for the cyan dye-activator layer.

The barrier layers may be of any suitable material which does not interfere with the transmission of radiation, i.e., a thin film of nitrocellulose. They may also be layers of a material having a charge opposite to that of the activator, of a material which is a mordant for the activator dye system, or of a material through which the activator dye diffuses very poorly. Finally, as a substitute for or in addition to the barrier layers, the activator dye may be rendered nonwandering by attachment of a macromolecule. Antihalation layers are well known in the art. See for example "Photographic Chemistry" by Pierre Glofkides, Fountain Press, London, 1958, volume 1, page 470 et seq.

Figure 9:
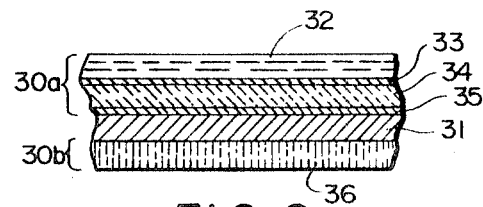
FIG. 9 illustrates in cross section another embodiment of film for full color.

FIG. 9 illustrates another structural embodiment of a photosensitive film in which like numbers refer to like elements in FIG. 8. In the structure of FIG. 9 the photosensitive layer assembly consists of two sections—section 30a adhered to one surface of the substrate 31 and section 30b adhered to the other surface of the substrate. This arrangement is, of course, only suitable if substrate 31 is a transparent film. It has, however, the advantage of offering the possibility of eliminating one barrier or antihalation layer. It also offers more flexibility in fixing processes, allowing different forms of fixing techniques to be applied to the two separated sections 30a and 30b. The actual arrangement of dyes and activators is also flexible and need not be that shown in FIG. 9.

Figure 10:
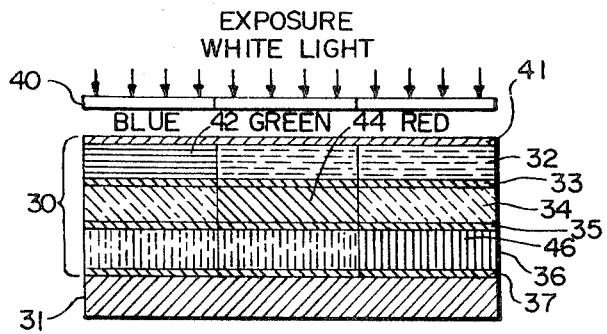
FIG. 10 illustrates diagrammatically the result of exposing the film of FIG. 8 to white light through a transparency which is red, green, and blue.
Figure 11:
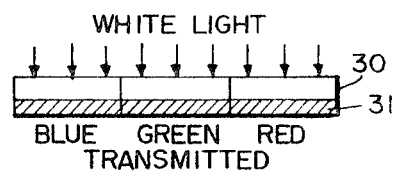
FIG. 11 illustrates diagrammatically the effect of projecting white light through the exposed and fixed film of FIG. 10.

FIG. 10 illustrates the manner in which the photosensitive layer assembly of the film functions when exposed to blue, green and red light generated by a suitable transparency 40. The film of FIG. 10 has an additional top layer 41, the function of which is to absorb ultraviolet radiation. It may or may not be strippable and is optional, its use being dependent upon whether or not it is necessary to prevent unwanted dye bleaching by ultraviolet light. In FIG. 10 it will be seen that the area 42 exposed to blue light absorbs blue and is bleached; the area 44 absorbs green and is bleached; and the area 46 absorbs red and is bleached. Since the system is a subtractive color system, when white light is passed through the exposed film, the area corresponding to area 42 (FIG. 11) will transmit blue, that corresponding to area 44 will transmit green and that corresponding to area 46 will transmit red.

The use of the indigoid dyes in a bleach-out system provides the possibility of forming intensely colored, lightfast images not only in a layer of a photosensitive coating applied to the usual substrates, e.g., films or papers but also within the substrate itself. Thus, cloth or fabric may be impregnated with the photosensitive composition to form dye images in situ in the fabric. Indigoid dyes with suitable activators also provide the possibility of making a one-dye black system.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawings shall be interpreted as illustrative and not in a limiting sense.

We claim:

1. A photosentitive composition which bleaches to form an image upon exposure to visible or ultraviolet radiation, comprising in combination an indigoid dye having the conjugated grouping

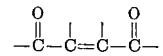

and an activator in a binder, said activator being a colored photoreducible dye capable of bleaching said indigoid dye when exposed to a predetermined wavelength range of electromagnetic radiation in the presence of said activator and selected from the group consisting of thiazines, thiazoles, acridines, azines, anthraquinones, phenanthrenequinones and xanthenes.

2. A photosensitive composition in accordance with claim 1 wherein said indigoid dye is a symmetrical derivativt of indigo, thioindigo or selenoindigo.

3. A photosensitive composition in accordance with claim 1 wherein said indigoid dye is an asymmetrical derivative of indigo, thioindigo or selenoindigo.

4. A photosensitive composition in accordance with claim 1 wherein said indigoid dye is an indirubin.

5. A photosensitive composition in accordance with claim 1 which is activated by visible light.

6. A photosensitive composition in accordance with claim 1 wherein the mole ratio of activator to dye ranges between about 0.01-to-1 to about 10-to-1.

7. A photosensitive composition in accordance with claim 1 wherein said binder incorporates the structure

wherein X is an electronegative element.

8. A photosensitive composition in accordance with claim 1 wherein said binder is nitrocellulose.

9. A photosensitive composition in accordance with claim 1 wherein said binder is ethyl cellulose.

10. A photosensitive composition in accordance with claim 1 wherein said binder is cellulose acetate butyrate.

11. A photosensitive composition in accordance with claim 1 wherein said binder is polystyrene.

12. A photosensitive composition in accordance with claim 1 including an additive which is a radiation filtering material or an encapsulated fixing agent.

13. A photosensitive article suitable for exposure to radiant energy for forming an image by direct bleach-out, comprising in combination
(a) a substrate; and
(b) a least one layer of a photosensitive composition affixed to said substrate in a binder, said photosensitive composition comprising in combination
(1) an indigoid dye, and
(2) an activator which is a colored photoreducible dye capable of bleaching said indigoid dye when exposed to a predetermined wavelength range of visible or ultraviolet radiation in the presence of said activator and is selected from the group consisting of thiazines, thiazoles, acridines, azines, anthraquinones, phenanthrenequinones and xanthenes.

14. A photosensitive article in accordance with claim 13 further characterized by having an intermediate coating layer interposed between said substrate and said layer of said photosensitive composition.

15. A photosensitive article in accordance with claim 13 characterized by having a plurality of photosensitive layers each of which comprises a photosensitive composition being sensitive to light of a wavelength different from the wavelength to which any other of said compositions is sensitive, whereby said article is capable of forming multicolored images upon exposure.

16. A photosensitive article in accordance with claim 15 wherein said layers are separated by layers of non-photosensitive material.

17. A photosensitive article in accordance with claim 15 wherein at least one of said plurality of photosensitive layers is on one surface of said substrate while the remaining of said layers are on the other surface of said substrate.

18. A method of forming an image of a master by direct bleach-out, characterized by exposing a photosensitive system in association with said master visible or ultraviolet radiation of a predetermined wavelength range, said photosensitive system comprising in combination an indigoid dye and an activator incorporated in a binder and being affixed to a substrate, said activator being a colored photoreducible dye capable of bleaching said indigoid dye when exposed to said radiation and being selected from the group consisting of thiazines, thiazoles, acridines, azines, anthraquinones, phenanthrenequinones and xanthenes.

19. A method in accordance with claim 18 further characterized by the step of fixing said image, wherein aid fixing comprises destroying said activator by applying to said image a reducing agent for said activator.

References Cited

UNITED STATES PATENTS

| | | | |
|---|---|---|---|
| 1,850,220 | 3/1932 | Wendt, et al. | 96—89 |
| 2,163,094 | 6/1939 | Kambli | 8—28 |
| 3,154,416 | 10/1964 | Fidelman | 96—89X |

J. TRAVIS BROWN, Primary Examiner

J. WINKELMAN, Assistant Examiner

U.S. Cl. X.R.

96—73, 89